United States Patent [19]

Akita

[11] 4,144,485

[45] Mar. 13, 1979

[54] CONTACTLESS CONNECTOR CIRCUIT

[75] Inventor: Sigeyuki Akita, Okazaki, Japan

[73] Assignee: Nippon Soken, Inc., Nishio, Japan

[21] Appl. No.: 801,251

[22] Filed: May 27, 1977

Related U.S. Application Data

[62] Division of Ser. No. 627,889, Oct. 31, 1975, abandoned.

[30] Foreign Application Priority Data

Dec. 3, 1974 [JP] Japan ............................... 49-139938

[51] Int. Cl.[2] ....................... H02P 13/16; H02P 13/04

[52] U.S. Cl. .................................. 323/44 R; 361/139; 363/20

[58] Field of Search ............. 336/DIG. 2, 192; 320/2; 323/44 R; 361/139; 307/265, 266, 267, 268; 363/15, 20

[56] References Cited

U.S. PATENT DOCUMENTS

| | | | |
|---|---|---|---|
| 2,379,664 | 7/1945 | Stanko | 336/DIG. 2 |
| 3,244,960 | 4/1966 | Stevens et al. | 323/44 R |
| 3,292,579 | 12/1966 | Buchanan | 323/44 R |
| 3,549,990 | 12/1970 | Hochheiser | 323/44 R |
| 3,550,682 | 12/1970 | Fowler | 336/DIG. 2 |
| 3,596,167 | 7/1971 | Enge | 323/44 R |
| 3,602,801 | 8/1971 | Williamson | 323/44 R |
| 3,885,211 | 5/1975 | Gutai | 320/2 |

*Primary Examiner*—Gerald Goldberg

*Attorney, Agent, or Firm*—Cushman, Darby & Cushman

[57] ABSTRACT

A contactless connector circuit for connecting two or more conductors with one another by means of reactance coupling, e.g., inductance coupling or capacitance coupling and transmitting electrical signals from one conductor to another by alternating current without contact between the conductors.

3 Claims, 7 Drawing Figures

CONTACTLESS CONNECTOR CIRCUIT

This is a division of application Ser. No. 627,889 filed Oct. 31, 1975, now abandoned.

BACKGROUND OF THE INVENTION

1. Field of the Invention

The present invention relates to a contactless connector circuit for accomplishing the transmission of electrical signals by alternating current between two or more conductors without contact therebetween.

2. Description of the Prior Art

The conventional connectors are so designed that conductors are brought into contact with one another to D.C. connect them and transmit signals. Therefore, it has been the tendency of the conventional devices to frequently cause contact fault due to the contact surface pressure, the formation of oxide films on the contact surfaces, etc., with the resulting detrimental effects on the transmission of signals.

SUMMARY OF THE INVENTION

It is an object of the present invention to provide a contactless connector circuit of a novel structure whereby two or more conductors are non-conductively connected with one another to transmit electrical signals from one conductor to another by alternating current, thus eliminating the conductive contact surfaces of the conductors and thereby overcoming the foregoing problem of contact fault due to the contact surface pressure, the formation of oxide films on the surfaces of the conductors in contact, etc.

The connector circuit according to the invention has among its great advantages the fact that there is no possibility of contact fault due to the contact surface pressure, the formation of oxide films on the surfaces of the conductors or the like and thus the connector circuit is particularly well suited for use in automobiles or the like where it is subjected to such unfavorable surrounding conditions as temperature changes, water, etc.

DESCRIPTION OF THE PREFERRED EMBODIMENTS

Figure 1:
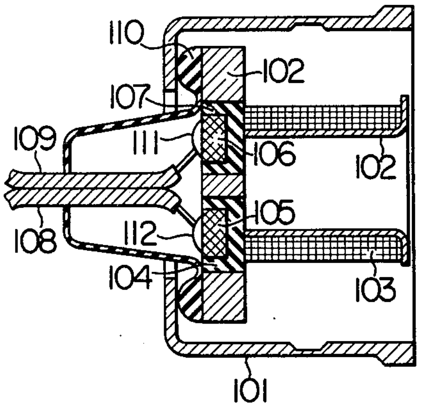
FIG. 1 is a sectional view showing the construction of a female part of a contactless connector utilized in a first embodiment of the invention.

The present invention will now be described with reference to the accompanying drawings. FIG. 1 illustrates the internal construction of a female part of a contactless connector according to the first embodiment. In this Figure, numeral 101 designates a housing, 102 a hollow and cylindrical bobbin around which a conductor is wound to form a coil 103 having its ends respectively connected to terminals 105 and 106 constituting a first pair of electrodes, and a first pair of conductors 108 and 109 are respectively connected to soldered parts 112 and 111 soldered to the first pair of electrodes 105 and 106. In other words, the conductor 108 is connected to the conductor 109 through the coil 103. The terminals 105 and 106 are respectively electrically insulated from the housing 101 and the bobbin 102 by insulators 104 and 107. Numeral 110 designates a rubber cover which constitutes a first case together with the housing 101.

Figure 2:
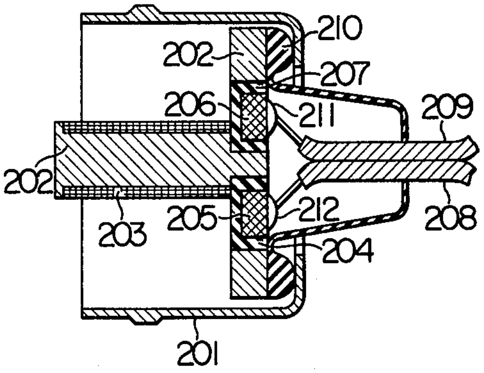
FIG. 2 is a sectional view showing the construction of a male part of the contactless connector utilized in the first embodiment.

FIG. 2 illustrates a male part of the contactless connector according to the first embodiment, in which numeral 201 designates a housing, 202 a cylindrical bobbin around which a conductor is wound to form a coil 203 having its ends respectively connected to soldered parts 212 and 211 soldered to terminals 205 and 206 constituting a second pair of electrodes and a second pair of conductors 208 and 209 are respectively connected to the terminals 205 and 206. In other words, the conductor 208 is connected to the conductor 209 through the coil 203. The terminals 205 and 206 are respectively insulated electrically from the housing 201 and the bobbins 202 by insulators 204 and 207. Numeral 210 designates a rubber cover which constitutes a second case together with the housing 201.

Figure 3:
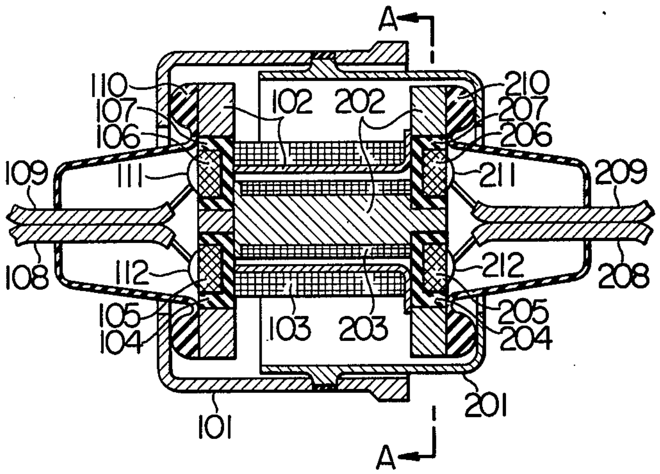
FIG. 3 is a sectional view showing the female and male parts of FIGS. 1 and 2 joined together.
Figure 4:
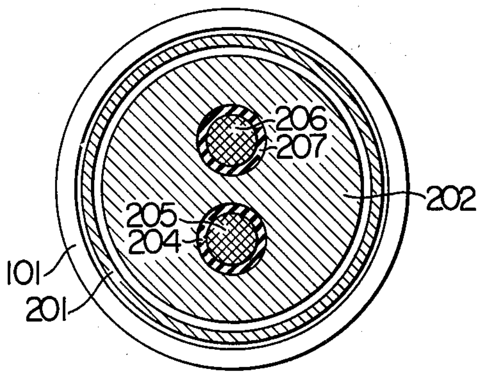
FIG. 4 is a sectional view taken along the line A—A of FIG. 3.

FIG. 3 shows the male and female parts of the contactless connector which is joined together. FIG. 4 is a sectional view taken along the line A—A of FIG. 3. The reference numerals used in FIGS. 3 and 4 correspond to those used in FIGS. 1 and 2. In this embodiment, the bobbins 102 and 202 and the coils 103 and 203 constitute electrical signal transmitting means.

Figure 5:
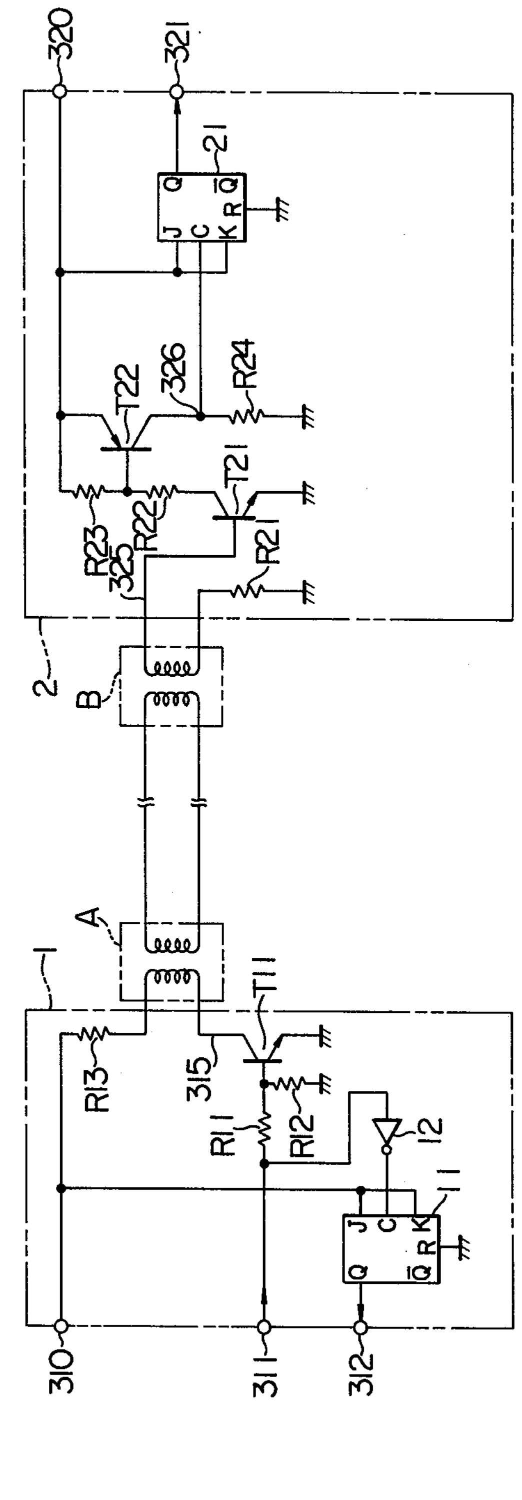
FIG. 5 is a wiring diagram showing a circuit for transmitting electrical signals using the contactless connectors of FIGS. 1 and 2.

Referring now to FIG. 5, there is illustrated a wiring diagram of a contactless connector circuit for transmitting pulse signals from a block 1 to a block 2 by means of the contactless connectors illustrated in FIGS. 1-4 and 7. In FIG. 5 numerals 310 and 320 designate power supply terminals from a conventional d.c. source (not shown), 311 a pulse signal input terminal, 312 and 321 pulse signal output terminals, 11 and 21 J-K flip-flops, 12 an inverter, $R_{11}$, $R_{12}$, $R_{13}$, $R_{21}$, $R_{22}$, $R_{23}$ and $R_{24}$ resistors, $T_{11}$ and $T_{21}$ NPN transistors, $T_{22}$ a PNP transistor, and A and B contactless connectors.

Figure 6:
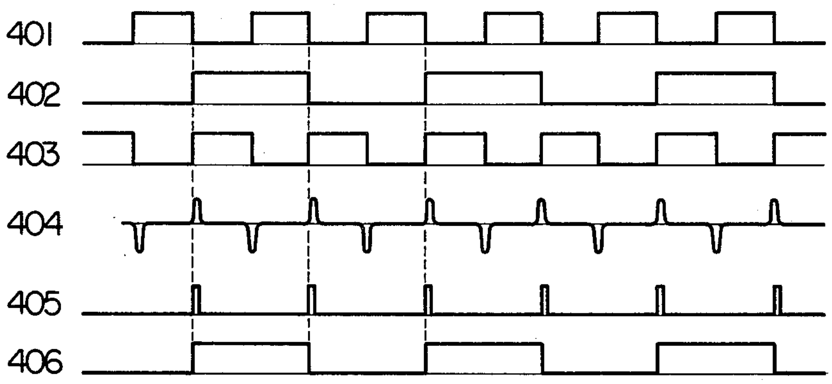
FIG. 6 is a voltage waveform diagram which is useful in explaining the operation of the circuit shown in FIG. 5.

With the construction described above, the operation of the apparatus is as follows. Assume that the pulse signals shown at 401 in FIG. 6 are applied to the terminal 311. Consequently, the signals 401 are introduced to the clock input of the J-K flip-flop 11 through the inverter 12 and thus the pulse signals shown at 402 in FIG. 6 appear at the terminal 312. The signal 401 are also applied to the base of the transistor $T_{11}$ so that the signals shown at 403 in FIG. 6 appear at a collector 315 of the transistor $T_{11}$. The signals 403 in turn generate the induced electromotive force shown at 404 in FIG. 6 on a line 325 through the contactless connectors A and B constructed as shown in FIG. 3. The signals 404 conduct the transistors $T_{21}$ and $T_{22}$ thus generating the signals shown at 405 in FIG. 6 at a point 326. The signal 405 is then applied to the clock input of the J-K flip-flop 21 thus generating the pulse signals shown at 406 in FIG. 6 at the terminal 321. The signal 406 is identical with the signal 402 generated at the terminal 312. It will thus be seen that the blocks 1 and 2 respectively generate the identical signal.

Figure 7:
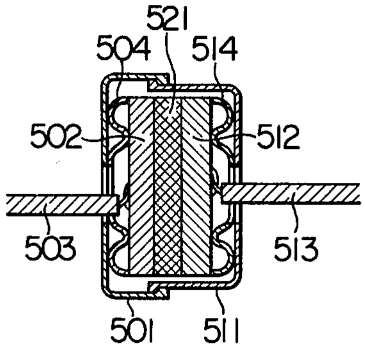
FIG. 7 is a sectional view showing a contactless connector utilized in a second embodiment of the invention.

While, coils are employed in the previously described contactless connector, it is possible to use a capacitor and FIG. 7 shows the construction of a contactless connector employing a capacitor. In this Figure, numeral 501 designates a female housing, 511 a male housing, 504 and 514 elastic materials, 502 a female electrode, 512 a male electrode. The electrodes 502 and 512 are respectively soldered to conductors 503 and 513. Disposed between the electrodes 502 and 512 is a dielectric material 521 constituting electrical signal transmitting means. Consequently, the conductors 503 and 513 are A.C. connected with each other through the capacitor.

While the present invention has been described with reference to its two referred embodiments illustrated in the accompanying drawings, it should be understood that numerous other changes and modification may be made without departing from the spirit and scope of this invention.

I claim:

1. A contactless connector circuit comprising:

first electric circuit means including a semiconductor switch which is adapted to be rendered on and off alternately in response to an input pulse signal;

a first coil, connected in series with said semiconductor switch of said first electric circuit means, for generating a first magnetic flux when energized by the conduction of said semiconductor switch;

a first case securely enclosing said first coil therein;

a second coil for generating a first a.c. signal in response to the changes of sair first magnetic flux during the magnetic coupling with said first coil;

a second case securely enclosing said second coil therein and detachably mating with said first case to cause the magnetic coupling between said first and second coils;

conductor means connected to said second coil for transmitting said first a.c. signal;

a third coil, connected to said conductor means, for generating a second magnetic flux in response to the changes of said first a.c. signal applied through said conductor means;

a third case securely enclosing said third coil therein;

a fourth coil for generating a second a.c. signal in response to the changes of said second magnetic flux during the magnetic coupling with said third coil;

a fourth case securely enclosing said fourth coil therein and detachably mating with said third case to cause the magnetic coupling between said third and fourth coils; and second electric circuit means including another semiconductor switch connected to said fourth coil for reshaping said second a.c. signal into an output pulse signal, said another semiconductor switch being responsive to one of positive and negative polarities of said second a.c. signal such that said output pulse signal is synchronized with said input pulse signal.

2. A contactless connector circuit according to claim 1, wherein said first electric circuit means includes first bistable means for frequency-dividing said input pulse signal, and wherein said second electric means includes second bistable means for frequency-dividing said output pulse signal to thereby generate an output signal which is equal to that of said first bistable means.

3. A contactless connector circuit comprising:

first electric circuit means including a semiconductor switch which is adapted to be rendered on and off alternately in response to an input pulse signal;

a first coil, connected in series with said semiconductor switch of said first electric circuit means, for generating a magnetic flux when energized by the conduction of said semiconductor switch;

a first case securely enclosing said first coil therein;

a second coil for generating an a.c. signal in response to the changes of said magnetic flux during the magnetic coupling with said first coil;

a second case securely enclosing said second coil therein and detachably mating with said first case to cause the magnetic coupling between said first and second coils; and second electric circuit means including another semiconductor switch connected to said second coil for reshaping said a.c. signal into an output pulse signal, said another semiconductor switch being responsive to one of positive and negative polarities of said second a.c. signal such that said output pulse signal is synchronized with said input pulse signal.

* * * * *